(12) United States Patent
Iwase

(10) Patent No.: US 11,305,423 B2
(45) Date of Patent: Apr. 19, 2022

(54) CONTROL DEVICE FOR ROBOT HAVING ARM

(71) Applicant: FANUC CORPORATION, Yamanashi (JP)

(72) Inventor: Yuuya Iwase, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/005,722

(22) Filed: Aug. 28, 2020

(65) Prior Publication Data

US 2021/0060770 A1    Mar. 4, 2021

(30) Foreign Application Priority Data

Sep. 3, 2019    (JP) .............................. JP2019-160318

(51) Int. Cl.
  *B25J 9/00*    (2006.01)
  *B25J 9/16*    (2006.01)

(52) U.S. Cl.
  CPC ........... *B25J 9/1633* (2013.01); *B25J 9/0081* (2013.01)

(58) Field of Classification Search
  CPC ...... B25J 9/1633; B25J 9/0081; B25J 9/1641; B25J 9/1674; B25J 13/085; G05B 19/423; G05B 2219/40582
  USPC .......... 700/257, 260–261; 318/432, 566, 574
  See application file for complete search history.

(56) References Cited

U.S. PATENT DOCUMENTS

| | | | |
|---|---|---|---|
| 6,430,473 B1 * | 8/2002 | Lee .......................... | B25J 9/162 318/568.16 |
| 7,185,774 B2 * | 3/2007 | Colgate ................... | B66C 17/00 212/270 |
| 9,156,164 B2 * | 10/2015 | Ando ...................... | B25J 13/085 |
| 10,405,931 B2 * | 9/2019 | Fukushima .............. | A61B 1/04 |

FOREIGN PATENT DOCUMENTS

JP    2011-206886 A    10/2011

* cited by examiner

*Primary Examiner* — Dalena Tran
(74) *Attorney, Agent, or Firm* — Studebaker & Brackett PC

(57) ABSTRACT

To provide a control device of a robot having an arm which causes the arm to be stopped more easily than conventionally by generating a load of appropriate magnitude to an operator during lead-through. The present invention relates to a control device of a robot having an arm, the control device including: a motor that generates torque in each axis of the robot; a torque generation control unit that controls the motor so as to generate a canceling torque which cancels friction of each axis of the robot when controlling the robot by external force tracking; and a torque changing unit that changes the canceling torque to a reference value or less.

4 Claims, 4 Drawing Sheets

CONTROL DEVICE FOR ROBOT HAVING ARM

This application is based on and claims the benefit of priority from Japanese Patent Application No. 2019-160318, filed on 3 Sep. 2019, the content of which is incorporated herein by reference.

BACKGROUND OF THE INVENTION

Field of the Invention

The present invention relates to a control device for a robot having an arm.

Related Art

A technique for performing a lead-through operation is generally used when a robot having an arm (hereinafter, may be referred to as an "arm robot") is directly taught (direct teaching), or when a robot is manually operated in the collaboration between the robot and an operator.

Here, "lead-through" is specifically a system in which teaching is performed by an operator holding an arm equipped with a robot or a hand, and moving the robot.

As one of the existing technologies for realizing lead-through, there is a control system in which torque for amplifying the force applied to the arm by an operator and torque (canceling torque) for canceling the friction generated in each axis of the robot are added to the components constituting the robot.

In this regard, in the control device used in the flexible control of a robot having at least one joint, a technique for calculating a friction compensation torque corresponding to the speed from a friction model has been known (e.g., refer to Japanese Unexamined Patent Application, Publication No. 2011-206886).

Patent Document 1: Japanese Unexamined Patent Application, Publication No. 2011-206886

SUMMARY OF THE INVENTION

Since the lead-through according to the above existing technique includes torque that completely counteracts friction in the torque elements, the arm robot behaves as if there were no friction.

For this reason, in the field of arm robots, at the time of lead-through, there is a problem in that the arm is moved by the motor torque resulting from estimation error of the force applied by the operator, resulting in becoming difficult to stop the arm. Furthermore, there is also a problem in that a load of appropriate magnitude is not generated to the operator in the lead-through at a constant speed.

Therefore, during the lead-through of the arm robot, it is desired to stop the arm more easily than conventionally by generating a load of appropriate magnitude to the operator.

An aspect of the present disclosure relates to a control device of a robot having an arm, the control device including: a motor that generates torque in each axis of the robot; a torque generation control unit that controls the motor so as to generate a canceling torque which cancels friction of each axis of the robot when controlling the robot by external force tracking; and a torque changing unit that changes the canceling torque to a reference value or less.

According to the aspect, it is possible to stop the arm more easily than conventionally during read-through by generating the load of appropriate magnitude to the operator.

DETAILED DESCRIPTION OF THE INVENTION

1 First Embodiment

Hereinafter, a control device 1 according to a first embodiment of the present invention will be described with reference to FIGS. 1 to 3.

<1.1 Configuration of the Invention>

Figure 1:
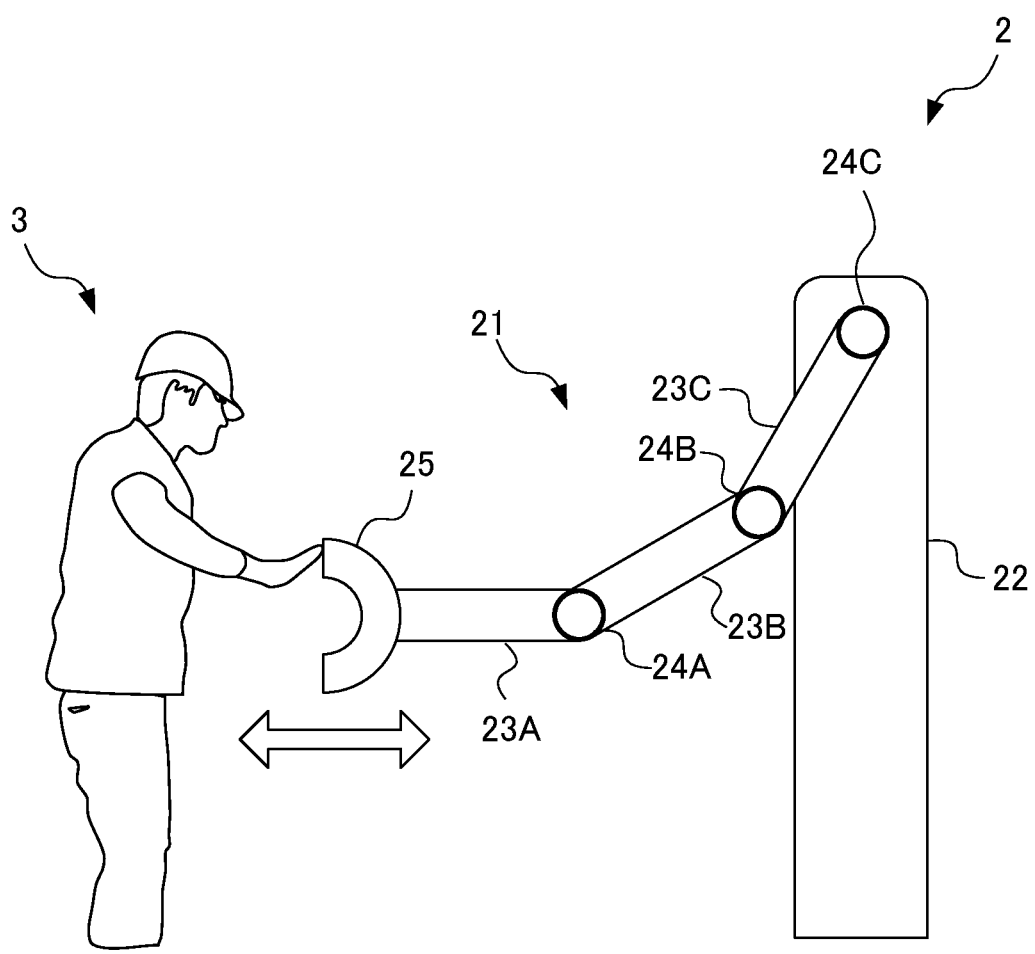
FIG. 1 is a diagram showing a lead-through method of a first embodiment.

FIG. 1 is a diagram showing an aspect of lead-through teaching assumed by the present embodiment. In the example shown in FIG. 1, an arm robot 2 includes an arm 21 and a robot body 22. Furthermore, the arm 21 includes links 23A to 23C, joints 24A to 24C, and a hand 25. More specifically, the joint 24A pivotally connects the link 23A and the link 23B, the joint 24B pivotally connects the link 23B and the link 23C, and the joint 24C pivotally connects the link 23C and the robot body 22. Furthermore, the hand 25 is disposed at an end of the link 23A opposite to the joint 24B. The hand 25 serves as a tip end portion of the arm 21.

Furthermore, each of the joints 24A to 24C is provided with a servo motor 27 for generating a driving force (torque) of rotation.

An operator 3 executes teaching for the arm robot 2 by moving the arm 21 with the arm 21 or the hand 25 gripped.

Figure 2:
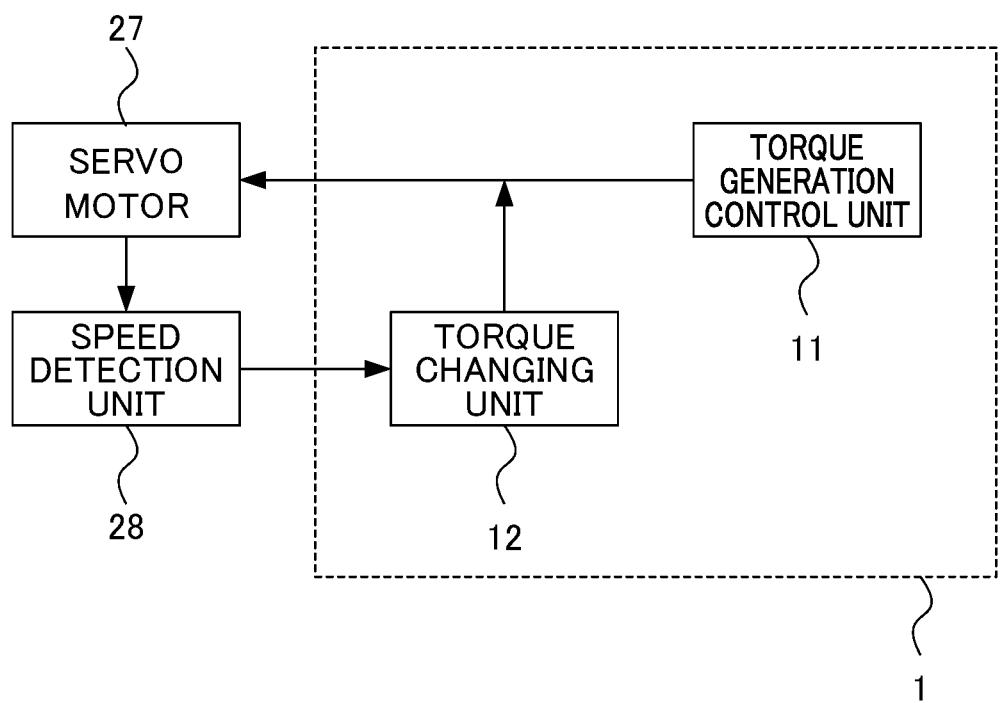
FIG. 2 is a functional block diagram of a control device according to the first embodiment.

FIG. 2 is a functional block diagram of the control device 1 according to the present embodiment. The control device 1 includes a torque generation control unit 11 and a torque changing unit 12.

As shown in FIG. 1, the torque generation control unit 11 controls the servo motor 27 so as to cancel the friction of the joints 24A to 24C of the arm robot 2 when controlling the arm robot 2 by lead-through (external force tracking), thereby generating a canceling torque.

The torque changing unit 12 changes the canceling torque to a reference value or less. Thus, the torque generated by the servo motor 27 is changed to the reference value or less.

In particular, in the present embodiment, the arm robot 2 is provided with a speed detecting unit 28 that detects the speed of the servo motor 27, and feedback of the speed value of the servo motor 27 detected by the speed detecting unit 28 is given to the torque changing unit 12. The torque changing unit 12 changes the canceling torque to the reference value or less based on this speed feedback value.

It should be noted that the speed detecting unit 28 can be realized by using, for example, a rotary encoder.

Furthermore, when the speed feedback value is a first threshold value or less, the torque changing unit 12 may change the canceling torque to 0 or more and a second threshold value or less, and when the speed feedback value is a third threshold value or more which is greater than the first threshold value, the torque changing unit 12 may change the canceling torque to 0 or more and a fourth threshold value or less which is greater than the second threshold value or less.

For example, when the speed feedback value is relatively small such as the first threshold value or less, the torque changing unit 12 may set the gain to be multiplied with the canceling torque to a value close to 0 in the range from 0 to 1, and when the speed feedback value is relatively large such as the third threshold value or more, the torque changing unit 12 may adjust the gain to be multiplied with the canceling torque in the range from 0 to 1.

Figure 3:
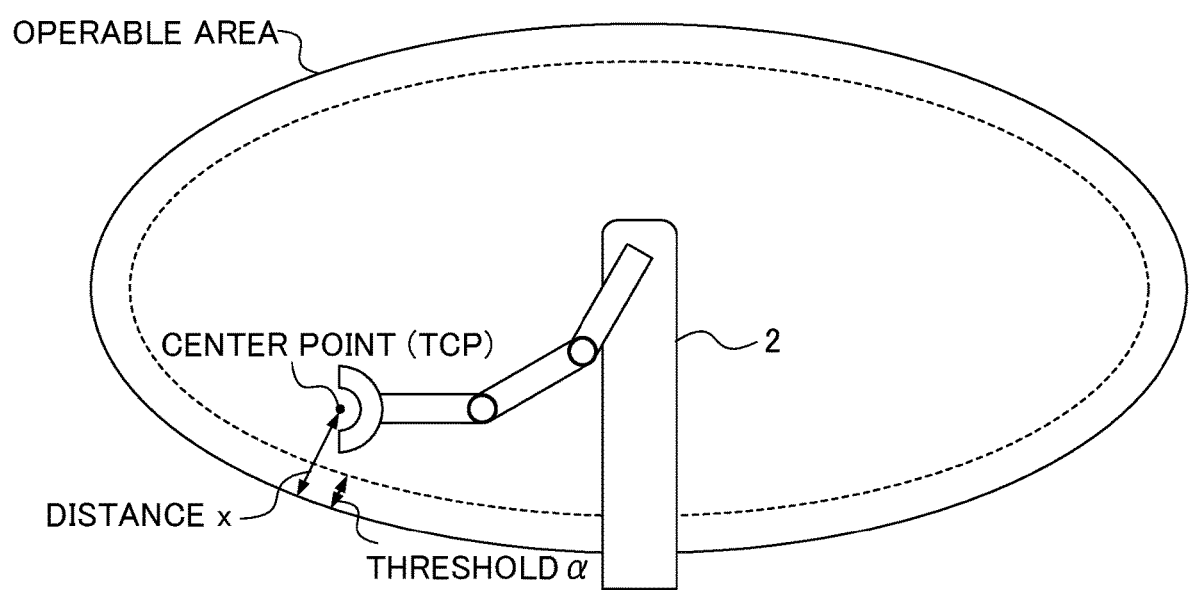
FIG. 3 is a diagram showing an operable area of the arm robot according to the first embodiment.

FIG. 3 shows an operable area of the arm 21 of the arm robot 2 shown in FIG. 1. For the arm robot 2, there is an operable area as shown in FIG. 1. Furthermore, at the time of lead-through teaching, when the hand 25 reaches the boundary of the operable area, the arm robot 2 stops. Since the operator 3 is not clearly aware of the boundary of the operable area, when the arm robot 2 suddenly stops, the operator 3 is unable to cope with the sudden movement of the arm robot 2, and thus there is a possibility of injury. In addition, a large load is applied to the arm robot 2, which increases the risk of failure.

Therefore, as shown in FIG. 3, in a case in which the distance x between the boundary of the operable area of the arm and the center point of the tip end portion of the arm (TCP: Tool Center Point) is the fifth threshold a or less, the torque changing unit 12 may change the torque so that the distance x and the gain used for changing the canceling torque have a positive correlation. Furthermore, the torque changing unit 12 may set this gain to 0 when the distance x is 0.

<1.2 Effects Exerted by First Embodiment>

The control device 1 according to the present embodiment includes a torque generation control unit 11 for controlling the servo motor 27 so as to generate a canceling torque to cancel the friction of each axis of the arm robot 2, and the torque changing unit 12 that changes the canceling torque to the reference value or less when controlling the arm robot 2 by external force tracking.

Therefore, at the time of lead-through, a load of appropriate magnitude is generated to the operator, whereby it is possible to stop the arm more easily than in conventional cases.

Furthermore, in the control device 1 according to the present embodiment, the torque changing unit 12 changes the canceling torque based on the speed feedback value from the servo motor 27.

Therefore, it is possible to appropriately adjust the ease of stopping and the load on the operator 3 according to the case of the lead-through operation.

Furthermore, in the control device 1 according to the present embodiment, when the speed feedback value is the first threshold value or less, the torque changing unit 12 changes the canceling torque to 0 or more and the second threshold value or less, and when the speed feedback value is the third threshold value or more which is greater than the first threshold value, the torque changing unit 12 changes the canceling torque to 0 or more and the fourth threshold value or less which is greater than the second threshold value.

This enables lead-through which can achieve both the ease of stopping the arm robot 2 which originates from the stability due to the canceling torque without lead-through being performed, and the ease of movement derived from the optimal load realized by the increase of the canceling torque at the time of lead-through.

Furthermore, in the control device 1 according to the present embodiment, when the distance between the boundary of the operable area of the arm 21 and the center point of the tip end portion (TCP) of the arm 21 is the fifth threshold value or less, the torque changing unit 12 changes the torque so that the above distance and the gain used to change the canceling torque have a positive correlation, and set the gain to 0 when the above distance is 0.

Therefore, when the arm 21 of the arm robot 2 reaches the boundary of the operable area, it is possible to prevent sudden stop and thus stop smoothly.

2 Second Embodiment

Hereinafter, referring to FIG. 4, a control device 1A according to a second embodiment of the present disclosure will be described. It should be noted that, for convenience of description, differences between the control device 1A and the control device 1 will be described in the following description, and description of other points will be omitted.

<2.1 Configuration of the Invention>

Figure 4:
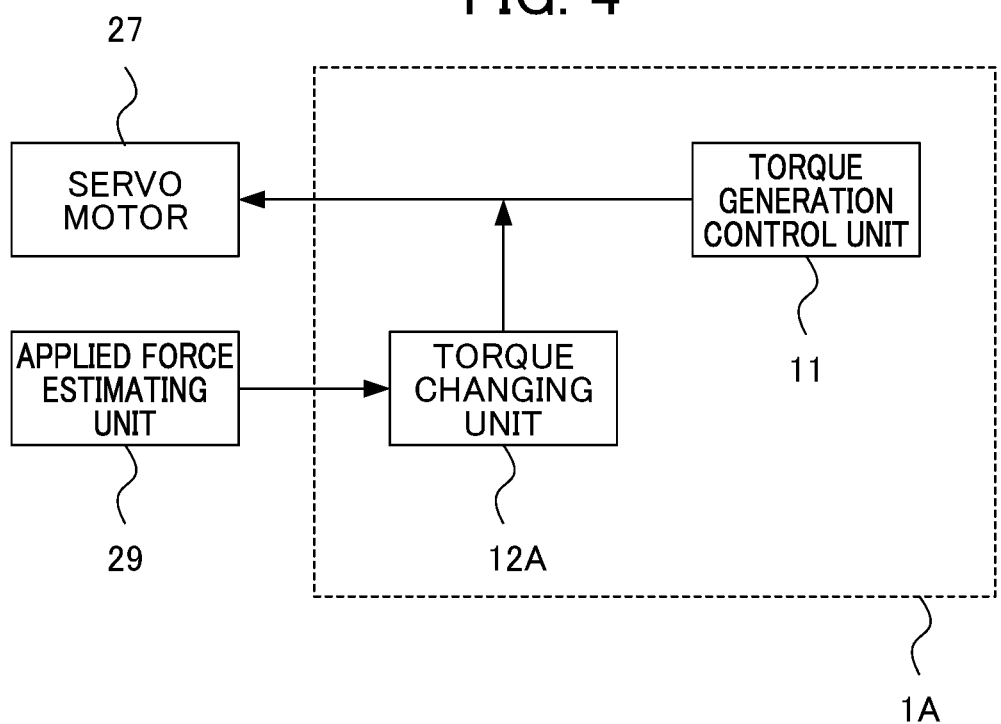
FIG. 4 is a functional block diagram of a control device according to a second embodiment.

FIG. 4 is a functional diagram of the control device 1A according to the present embodiment. Unlike the control device 1, the control device 1A includes a torque changing unit 12A instead of the torque changing unit 12.

The torque changing unit 12A acquires an estimated value of the force applied by the operator 3 to the arm 21 from an applied force estimating unit 29 provided to the arm 21 or the hand 25 of the arm robot 2, and changes the canceling torque to a reference value or less based on the estimated value. It should be noted that the applied force estimating unit 29 is realized by, for example, a force sensor.

<2.2 Effect Exerted by Second Embodiment>

In the control device 1A according to the present embodiment, the torque changing unit 12A changes the torque based on the estimated value of the force applied by the operator to the arm 21.

Therefore, it is possible to appropriately adjust the ease of stopping and the load to the operator 3 according to the case of the lead-through operation.

EXPLANATION OF REFERENCE NUMERALS 1, 1A control device
2 arm robot
3 operator
11 torque generation control unit
12, 12a torque changing unit
21 arm
25 hand
27 servo motor
28 speed detection unit
29 applied force estimating unit

What is claimed is:

1. A control device of a robot having an arm, the control device comprising:
   a motor that generates torque in each axis of the robot;
   a torque generation control unit that controls the motor so as to generate a canceling torque which cancels friction of each axis of the robot when controlling the robot by external force tracking; and
   a torque changing unit that changes the canceling torque to a reference value or less.

2. The control device according to claim 1, wherein the torque changing unit changes the canceling torque based on a speed feedback value from the motor, or an estimated value of a force applied by a user to the arm.

3. The control device according to claim 2, wherein, in a case in which the speed feedback value or the estimated value is a first threshold value or less, the torque changing unit changes the canceling torque to a value between zero or more and a second threshold value or less, and in a case in which the speed feedback value or the estimated value is a third threshold value which is greater than the first threshold value or more, the torque changing unit changes the canceling torque to a value between zero or more and a fourth threshold value which is greater than the second threshold value or less.

4. The control device according to claim 2, wherein, in a case in which a distance between a boundary of an operable area of the arm and a center point of a tip end portion of the arm is a fifth threshold value or less, the torque changing unit changes the canceling torque so that the distance and a gain used for changing the canceling torque have a positive correlation, and sets the gain to zero when the distance is zero.

\* \* \* \* \*